United States Patent
Joyo et al.

(10) Patent No.: US 11,146,124 B2
(45) Date of Patent: Oct. 12, 2021

(54) ROTATING ELECTRIC MACHINE STATOR

(71) Applicant: Mitsubishi Electric Corporation, Tokyo (JP)

(72) Inventors: Takahiro Joyo, Tokyo (JP); Haruyuki Kometani, Tokyo (JP); Nobuyuki Sora, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 57 days.

(21) Appl. No.: 16/610,694

(22) PCT Filed: May 11, 2017

(86) PCT No.: PCT/JP2017/017817
§ 371 (c)(1),
(2) Date: Nov. 4, 2019

(87) PCT Pub. No.: WO2018/207302
PCT Pub. Date: Nov. 15, 2018

(65) Prior Publication Data
US 2021/0159742 A1    May 27, 2021

(51) Int. Cl.
*H02K 1/16* (2006.01)
*H02K 1/18* (2006.01)

(52) U.S. Cl.
CPC .............. *H02K 1/16* (2013.01); *H02K 1/18* (2013.01)

(58) Field of Classification Search
CPC ................................... H02K 1/16; H02K 1/18
(Continued)

(56) References Cited

U.S. PATENT DOCUMENTS 3,075,103 A * 1/1963 Ward, Jr. ................. H02K 9/22
                                                    310/54
3,691,416 A * 9/1972 Gibbs .................... H02K 3/505
                                                    310/260
(Continued)

FOREIGN PATENT DOCUMENTS

CN    101494394 A    7/2009
CN    102208837 A    10/2011
(Continued)

OTHER PUBLICATIONS

Extended European Search Report dated Mar. 26, 2020 for corresponding European patent application No. 17908773.9, 8 pages.
(Continued)

*Primary Examiner* — Jose A Gonzalez Quinones
(74) *Attorney, Agent, or Firm* — Buchanan Ingersoll & Rooney PC

(57) ABSTRACT

A stator of a rotating electric machine Includes a stator core that has a plurality of slots and in which electromagnetic steel sheets are stacked in the axial direction, a stator coil inserted into the slots, a finger plate provided on an axially outer end surface of the stator core, and a clamper provided on an axially outer end surface of the finger plate and for clamping the stator core via the finger plate. Furthermore, a rectangular parallelepiped-shaped notch is provided on a part of the finger plate from any position at an anti-stator core side located lateral to an upper stator coil in a circumferential direction to a radially inner end portion.

1 Claim, 9 Drawing Sheets

(58) Field of Classification Search
USPC .................. 310/114, 400, 216.114, 270
See application file for complete search history.

(56) References Cited

U.S. PATENT DOCUMENTS

2009/0195115 A1   8/2009   Thangirala
2011/0241455 A1   10/2011  Yoshida et al.

FOREIGN PATENT DOCUMENTS

| JP | S61-73529   | A | 4/1886  |
|----|-------------|---|---------|
| JP | S51136107   | A | 11/1976 |
| JP | S52-97101   | A | 8/1977  |
| JP | S60-82037   | A | 5/1985  |
| JP | H11252830   | A | 9/1999  |
| JP | 2003-199267 | A | 7/2003  |
| JP | 2008312379  | A | 12/2008 |

OTHER PUBLICATIONS

Office Action (Notice of Reasons for Refusal) dated May 8, 2020, by the Japan Patent Office in corresponding Japanese Patent Application No. 2019-516810 and English translation of the Office Action. (8 pages).

International Search Report (PCT/ISA/210), with translation, and Written Opinion (PCT/ISA/237) dated Aug. 15, 2017, by the Japan Patent Office as the International Searching Authority for International Application No. PCT/JP2017/017817.

Chinese Office Action dated Dec. 18, 2020 in corresponding Chinese Patent Application No. 201780090391.2, with English translation (12 pages).

Office Action dated Feb. 16, 2021 issued in corresponding European Patent Application No. 17908773.9 (6 pages).

Office Action dated May 24, 2021, by the Chinese Patent Office in corresponding Chinese Patent Application No. 201780090391.2 and English translation of the Office Action. (11 pages).

* cited by examiner

ROTATING ELECTRIC MACHINE STATOR

TECHNICAL FIELD

The present invention relates to a stator of a rotating electric machine and particularly relates to a structure for reducing loss in a stator end portion.

BACKGROUND ART

As a stator of a rotating electric machine in the conventional art, there has been a stator in which a stator core is clamped by finger plates and clampers provided at both ends thereof. The stator core, the finger plates, and the clampers are uniformly and firmly clamped by a core bolt penetrating the core and an electrically insulated through bolt penetrating a core slot back portion, and a plurality of stator coils are inserted into slots in an axial direction of the stator core.

During operation of the rotating electric machine, a leakage magnetic flux is generated from the stator coils and a rotor coil and enters the finger plates. Due to the leakage magnetic flux that has entered the finger plate, eddy currents flow through a peripheral portion, and loss is generated. The finger plates are formed by metallic member having relatively large resistance such as SUS. For example, in a rotating electric machine such as a turbine generator, a leakage magnetic flux having a low frequency of 50 Hz or 60 Hz is generated, and thus a skin depth at which eddy currents flow tends to increase.

Thus, in a conventional rotating electric machine, the height of a finger plate having a rectangular parallelepiped structure is reduced to a skin height degree, or the height of an end portion of the finger plate is reduced by forming the end portion of the finger plate so as to become a tapered shape, whereby loss by eddy currents is reduced (see Patent Document 1).

CITATION LIST

Patent Document

Patent Document 1: Japanese Laid-Open Patent Publication No. 11-252830

SUMMARY OF THE INVENTION

Problems to be Solved by the Invention

As described above, in the conventional art, loss by eddy currents is reduced by reducing the height of the finger plate to the skin depth degree. However, in accordance with an increase in capacity of a rotating electric machine, an amount of a leakage magnetic flux that enters a finger plate increases, and loss by eddy currents increases, and there is a problem that efficiency of the rotating electric machine decreases. Therefore, the necessity to deal with such a problem arises.

The present invention has been made to solve the above-described problem, and an object of the present invention is to obtain a stator, of a rotating electric machine, which can assuredly reduce loss generated in a stator end portion of the rotating electric machine, by a simple structure of a finger plate.

Means of Solution to the Problems

A stator of a rotating electric machine according to the present invention includes a stator core that has a plurality of slots and in which electromagnetic steel sheets are stacked in the axial direction, stator coils inserted into the slots, and a finger plate provided on an axially outer end surface of the stator core. Further a rectangular parallelepiped-shaped notch is provided on a part of the finger plate from any position at an anti-stator core side located lateral to an upper stator coil in a circumferential direction to a radially inner end portion.

Effect of the Invention

According to a stator of a rotating electric machine configured as described above, loss by eddy currents generated at the finger plate can be reduced by a simple structure, and thus the efficiency of the rotating electric machine can be enhanced.

EMBODIMENTS FOR CARRYING OUT THE INVENTION

Embodiment 1

Figure 1:
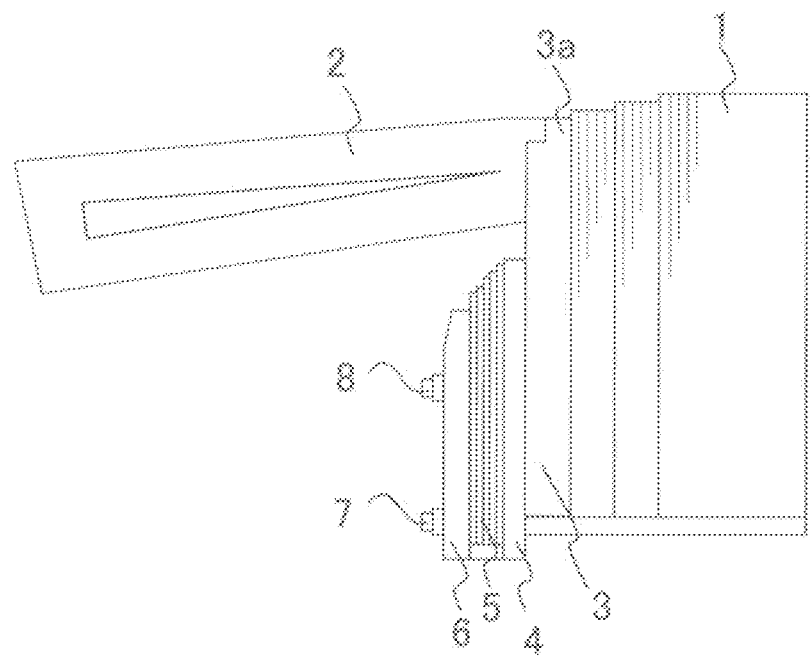
FIG. 1 is a cross-sectional view showing the configuration of a stator of a rotating electric machine according to Embodiment 1.
Figure 2:
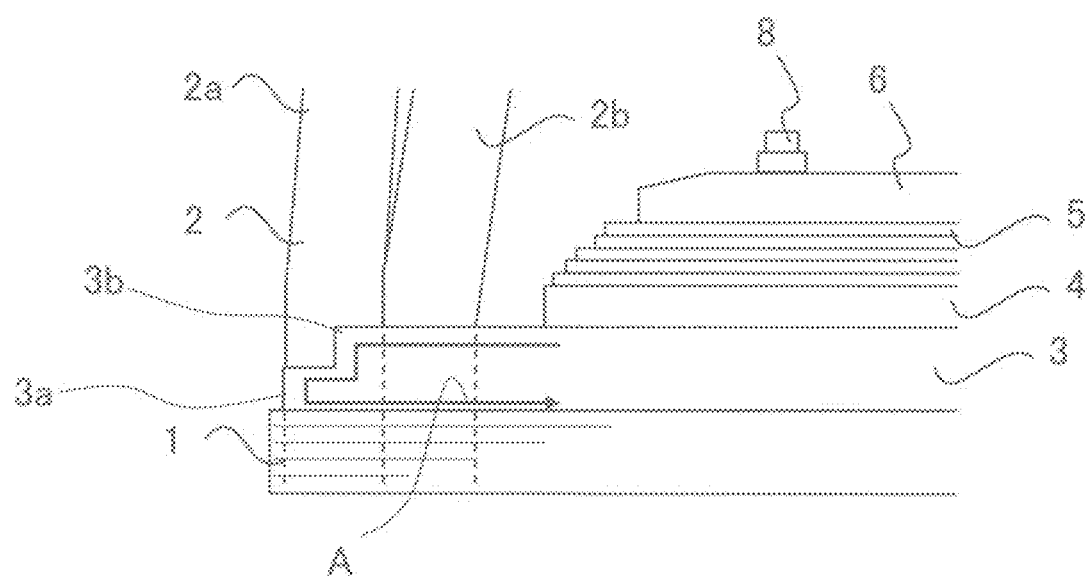
FIG. 2 is a cross-sectional view showing a main part of the stator of the rotating electric machine according to Embodiment 1.

Hereinafter, Embodiment 1 will be described with reference to the drawings. FIG. 1 is a cross-sectional view showing the configuration of a stator of a rotating electric machine according to Embodiment 1. FIG. 2 is a cross-sectional view showing a main part of the stator of the rotating electric machine. In the drawings, the stator includes a stator core 1, a stator coil 2, a finger plate 3, a clamper 4, a shield core 5, a shield holder 6, a core bolt 7, and a through bolt 8.

The stator core 1 is formed by stacking electromagnetic steel sheets in an axial direction and further has a plurality of open slots. The stator coil 2 is wound in the slots of the stator core 1. The finger plate 3 is provided on an axially outer end surface of the stator core 1. The clamper 4 is provided on an axially outer end surface of the finger plate 3, clamps the stator core 1 via the finger plate 3, and is further formed by a magnetic metal. The shield core 5 is provided on an axially outer end surface of the clamper 4 and is formed by stacking electromagnetic steel sheets. The shield holder 6 fixes the shield core 5. The core bolt 7 is provided on the radially outer side, and penetrates and fixes the stator core 1, the finger plate 3, the clamper 4, the shield core 5, and the shield holder 6. The through bolt 8 is provided on the radially inner side, and penetrates and fixes the stator core 1, the finger plate 3, the clamper 4, the shield core 5, and the shield holder 6. In addition, a part of a radially inner end portion 3a of the finger plate 3 is processed by cutting-off in order to reduce eddy currents.

Next, operation will be described.

During operation of the rotating electric machine, a leakage magnetic flux is generated from an upper stator coil end portion 2a, a lower stator coil end portion 2b, and a rotor coil that is not shown, and this leakage magnetic flux enters the finger plate 3. In the finger plate 3, an eddy current that cancels the leakage magnetic flux flows through a peripheral portion of the finger plate 3. An arrow A in FIG. 2 indicates a flow path of the eddy current. A part of the radially inner end portion 3a of the finger plate 3 is processed by cutting-off, whereby the flow path of the eddy current is adjusted, therefore loss by eddy currents generated at the finger plate 3 can be reduced.

Figure 3:
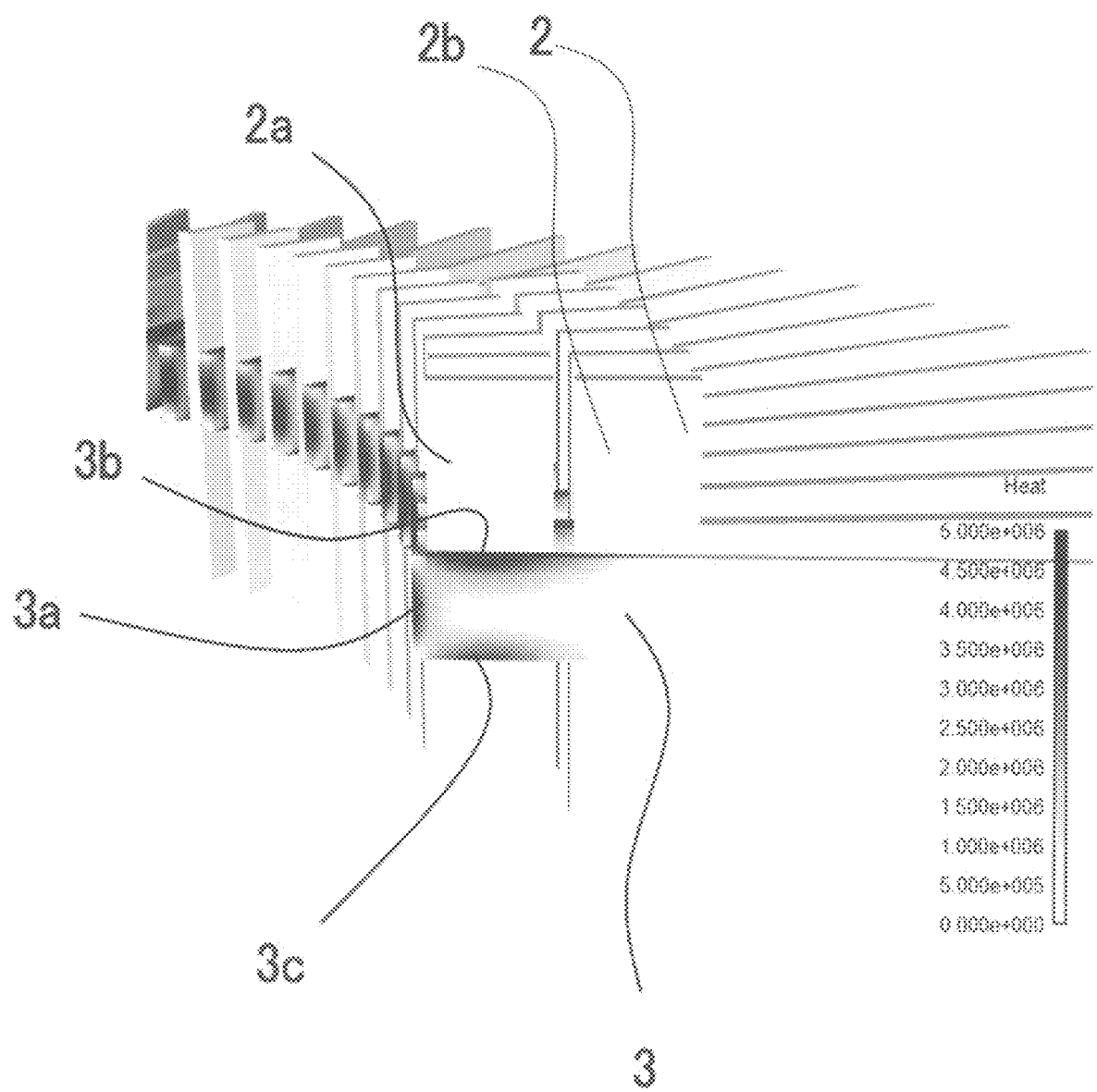
FIG. 3 is a drawing of a loss distribution obtained by calculating loss generated at a finger plate that is not partially processed by cutting-off, by three-dimensional electromagnetic field analysis.

FIG. 3 is a drawing of a loss distribution obtained by calculating loss generated at the finger plate 3 that is not partially processed by cutting-off, by three-dimensional electromagnetic field analysis. From the analysis result, it is found for the first time that loss by eddy currents generated at the finger plate 3 is generated due to a leakage magnetic flux in the circumferential direction produced by a stator coil current, and the loss is great at the radially inner end portion 3a and an anti-stator core side 3b located lateral to an upper stator coil in the circumferential direction. In FIG. 3, 5.00e+006 indicates $5 \times 10^6$, the unit thereof is $W/m^3$, and the value represents a loss density of generated heat. The same applies to FIG. 4 described later. At a stator side 3c located lateral to the upper stator coil in the circumferential direction, loss by eddy currents is not so great, since a magnetic flux passes through the stator core 1.

Figure 4:
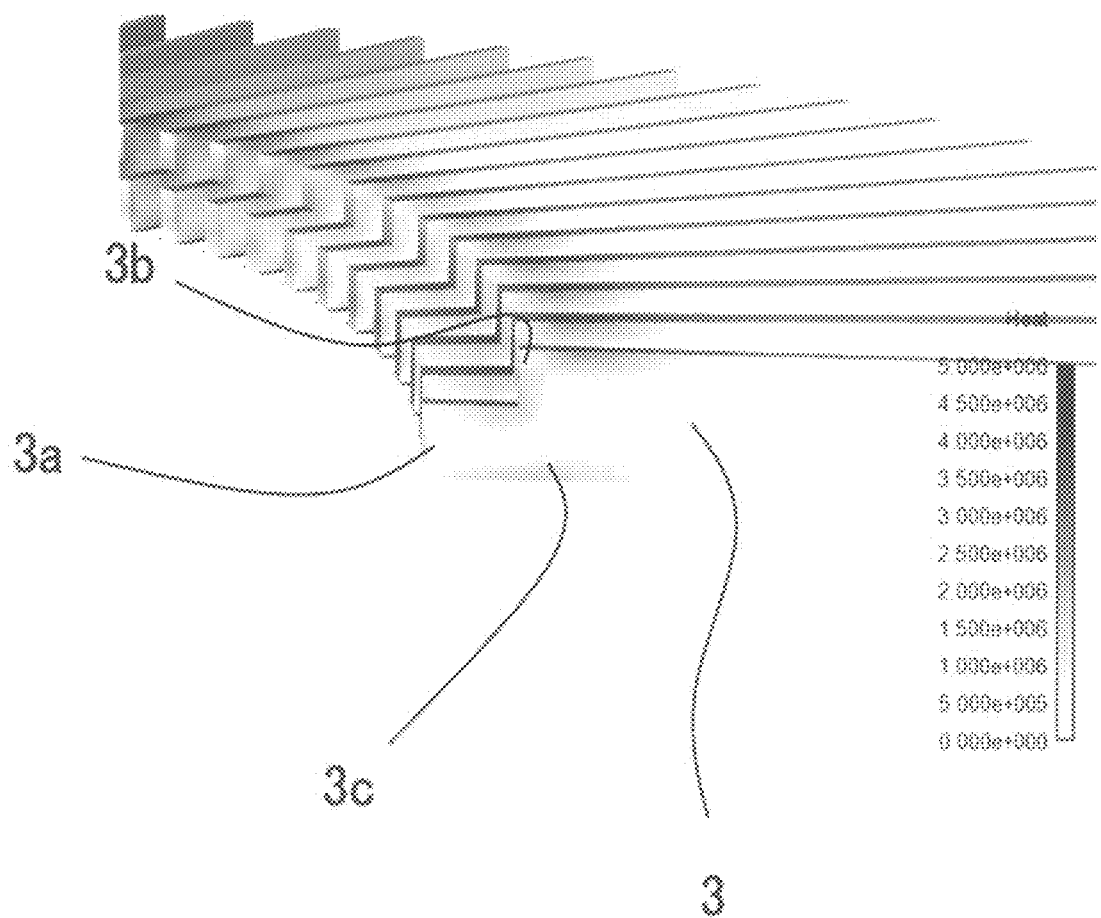
FIG. 4 is a drawing of a loss distribution by eddy currents generated at a finger plate according to Embodiment 1.

For loss at the radially inner end portion 3a of the finger plate 3, a loss reduction effect is achieved by reducing the height of the finger plate 3 on the basis of a skin depth, but a sufficient reduction effect is not achieved for loss at the anti-stator core side 3b. As a result of a study for a structure that can reduce loss at the anti-stator core side 3b, it is found that, in order to reduce loss at the anti-stator core side 3b, it is effective that a part from any position at the anti-stator core side 3b to the radially inner end portion 3a is processed by cutting-off so as to form into a rectangular parallelepiped shape, that is, it is effective to provide a rectangular parallelepiped-shaped cut thereon. FIG. 4 is a drawing of a loss distribution by eddy currents generated at the finger plate 3 in which a part from any position at the anti-stator core side 3b located lateral to the upper stator coil in the circumferential direction to the radially inner end portion 3a is processed by cutting-off so as to form into a rectangular parallelepiped shape. It is confirmed that the loss is considerably reduced as compared to the case of FIG. 3. That is, it is found that, in the case of FIG. 3, as compared to the case of FIG. 4, many dark black portions are distributed at the radially inner end portion 3a and the anti-stator core side 3b of the finger plate 3. That is, it is found that a large amount of heat is generated.

Figure 5A:
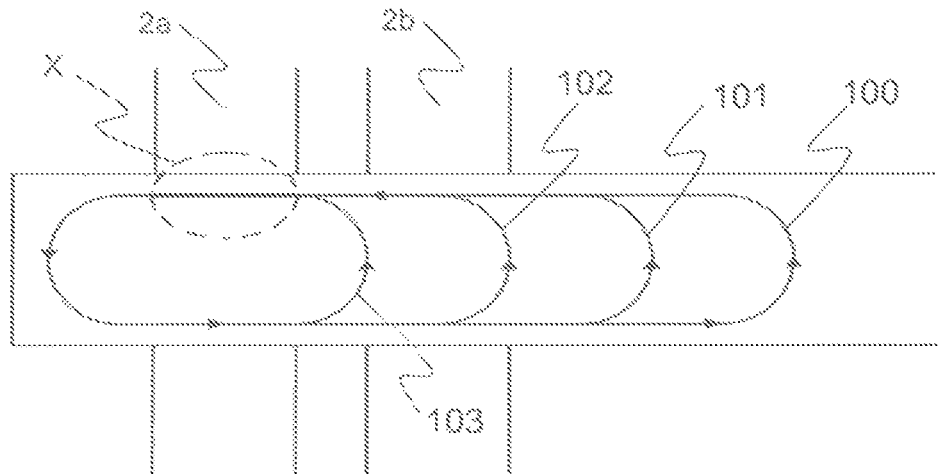
FIG. 5A is a front view showing a current path in a finger plate.

Next, the mechanism that loss by eddy currents generated at the finger plate 3 is reduced by processing a part from any position at the anti-stator core side 3b to the radially inner end portion 3a by cutting-off so as to form into a rectangular parallelepiped shape, will be described in detail with reference to FIG. 5. From the loss density distribution shown in FIG. 3, it is found that the loss density is highest at the portion lateral to the upper stator coil in the circumferential direction. FIG. 5A is a front view showing a current path in a finger plate that is not processed by cutting-off as shown in FIG. 3. In FIG. 5A, it is considered that the current path is formed by eddy current loops as shown by loops 100 to 103. It should be noted that although the current path actually includes many loops whose number is larger than 4, four loops are set in order to simplify the description. The respective eddy current loops 100 to 103 overlap each other to form a concentration portion X at the portion lateral to the upper stator coil end portion 2a in the circumferential direction, and the loss density is high at the concentration portion X.

Figure 5B:
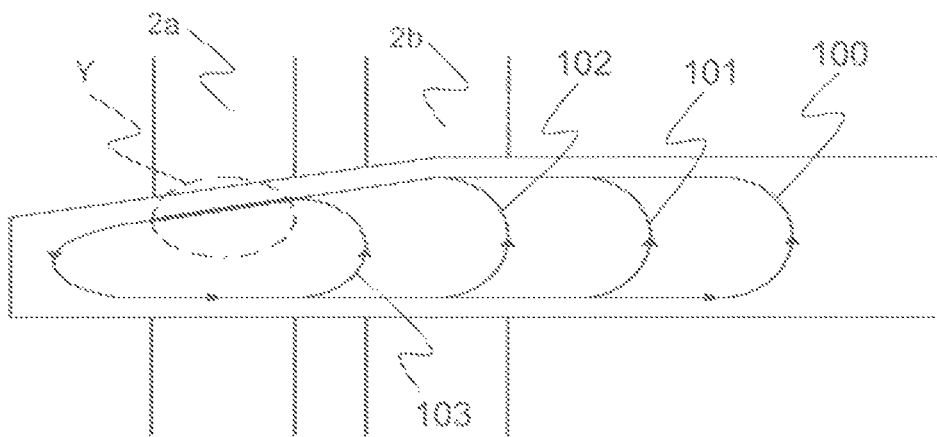
FIG. 5B is a front view showing a current path in a finger plate.
Figure 5C:
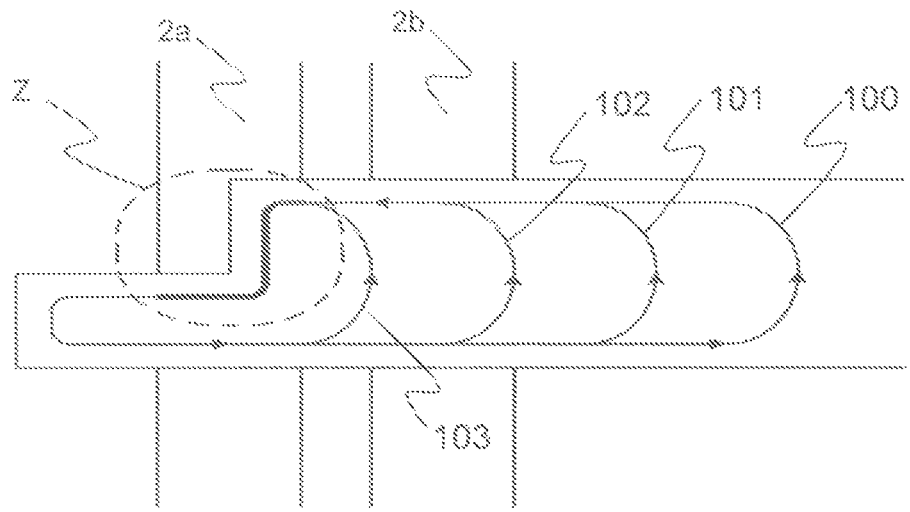
FIG. 5C is a front view showing a current path in a finger plate.

FIG. 5B is a front view showing a current path in a finger plate that is processed by cutting-off so as to form into a tapered shape. In this case as well, the respective eddy current loops 100 to 103 overlap each other to form a concentration portion Y at the portion lateral to the upper stator coil end portion 2a in the circumferential direction, and the loss density is high at the concentration portion Y. In the case of FIG. 5B, the length of the current path at the concentration portion Y at the portion lateral to the upper stator coil end portion 2a in the circumferential direction is slightly larger than the length of the current path at the concentration portion X, but the difference therebetween is small. Here, the smaller the area through which a magnetic flux passes is and further, the longer the length of a loop of a current path is, the smaller the magnitude of an eddy current is. Therefore, loss by eddy currents is only slightly reduced by merely processing by cutting-off so as to form into a tapered shape. FIG. 5C is a front view showing a current path in a finger plate that is processed by cutting-off so as to form into a rectangular parallelepiped shape. It is found that, even when the respective eddy current loops 100 to 103 are concentrated to form a concentration portion Z at the portion lateral to the upper stator coil end portion 2a in the circumferential direction, since the portion processed by cutting-off so as to form into a rectangular parallelepiped shape is present at this portion, the length of the current path at the concentration portion Z is considerably increased as compared to those in the cases of FIG. 5A and FIG. 5B. That is, even when the area through which a magnetic flux passes is equal to that in the case of the finger plate that is processed by cutting-off so as to form into a tapered shape as shown in FIG. 5B, loss by eddy currents can be considerably reduced by performing cutting-off processing such that the length of the current path at the portion at which eddy currents are concentrated is increased. As described above, it is found that eddy currents are concentrated at the portion lateral to the upper stator coil end portion 2a in the circumferential direction, and the feature of the present embodiment is that loss by eddy currents can be considerably reduced by processing this portion by cutting-off so as to form into a rectangular parallelepiped shape.

The finger plate 3 is disposed in order to press the stator core 1 in the axial direction, but does not lose its original function if a part from the anti-stator core side 3b located lateral to the upper stator coil in the circumferential direction to the radially inner end portion 3a is merely processed by cutting-off. In Embodiment 1, by processing a part of the finger plate 3 from any position on the anti-stator core side 3b located lateral to the upper stator coil in the circumferential direction to the radially inner end portion 3a by cutting-off so as to form into a rectangular parallelepiped shape in order to provide a rectangular parallelepiped-shaped notch thereon as described above, loss by eddy currents generated at the finger plate 3 is reduced, so that it is possible to enhance the efficiency of the rotating electric machine. That is, as described above, since eddy currents are concentrated on the anti-stator core side 3b located lateral to the upper stator coil in the circumferential direction, loss by eddy currents can be considerably reduced by processing this portion by cutting-off so as to form into a rectangular parallelepiped shape.

Embodiment 2

Figure 6:
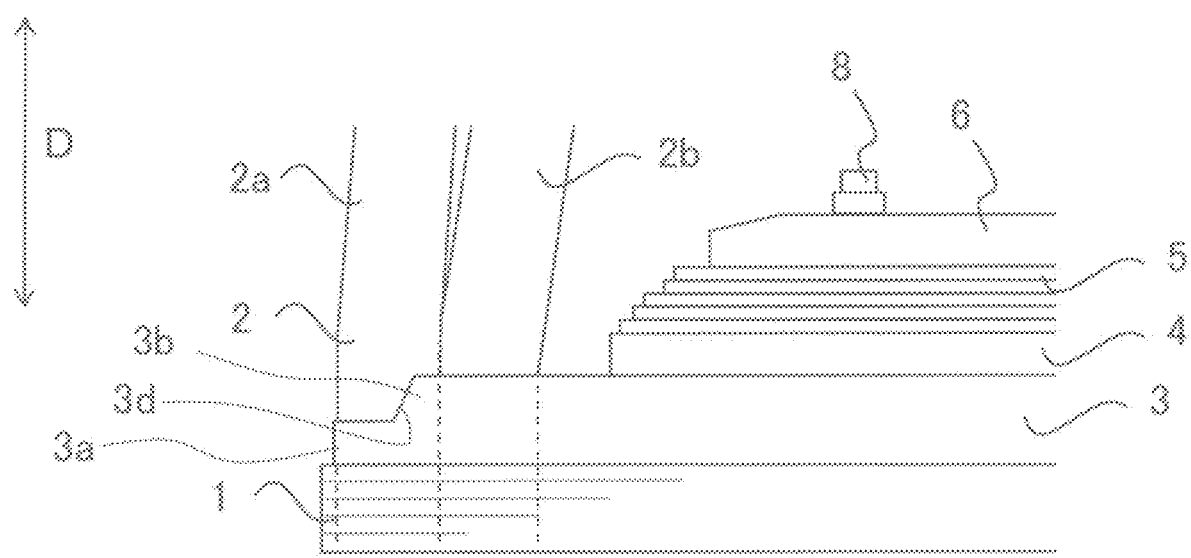
FIG. 6 is a cross-sectional view showing a main part of a stator of a rotating electric machine according to Embodiment 2.

FIG. 6 is a cross-sectional view showing a main part of a stator of a rotating electric machine according to Embodiment 2. In the drawing, the same reference characters as those in Embodiment 1 denote identical or corresponding parts. In FIG. 6, a part of a finger plate 3 from any position at the anti-stator core side 3b located lateral to the upper stator coil in the circumferential direction to the radially inner end portion 3a is processed by cutting-off. But the cut surface, which is parallel to the axial direction in Embodiment 1, is not parallel to the axial direction in the present embodiment. And a cut surface 3d is obliquely cut such that the height thereof increases from the radially inner side toward the radially outer side. That is, a surface, opposed to the axial direction, of a rectangular parallelepiped-shaped notch is formed as an inclined surface such that the height thereof increases from the radially inner side toward the radially outer side.

In Embodiment 2, since the cut surface 3d is not parallel to the axial direction but obliquely formed, concentration of stress on the cut surface 3d is alleviated, and thus it is possible to enhance the mechanical strength. In the field of strength of materials, it has been proved that, when an inclination angle is increased, a stress concentration factor decreases and thus concentration of stress is alleviated. Therefore, the mechanical strength is enhanced, and further the same advantageous effects as those in Embodiment 1 are achieved. In the present embodiment, the cut surface 3d opposed to an axial direction D is not parallel to the axial direction D but obliquely formed from the radially inner side toward the radially outer side.

Figure 7:
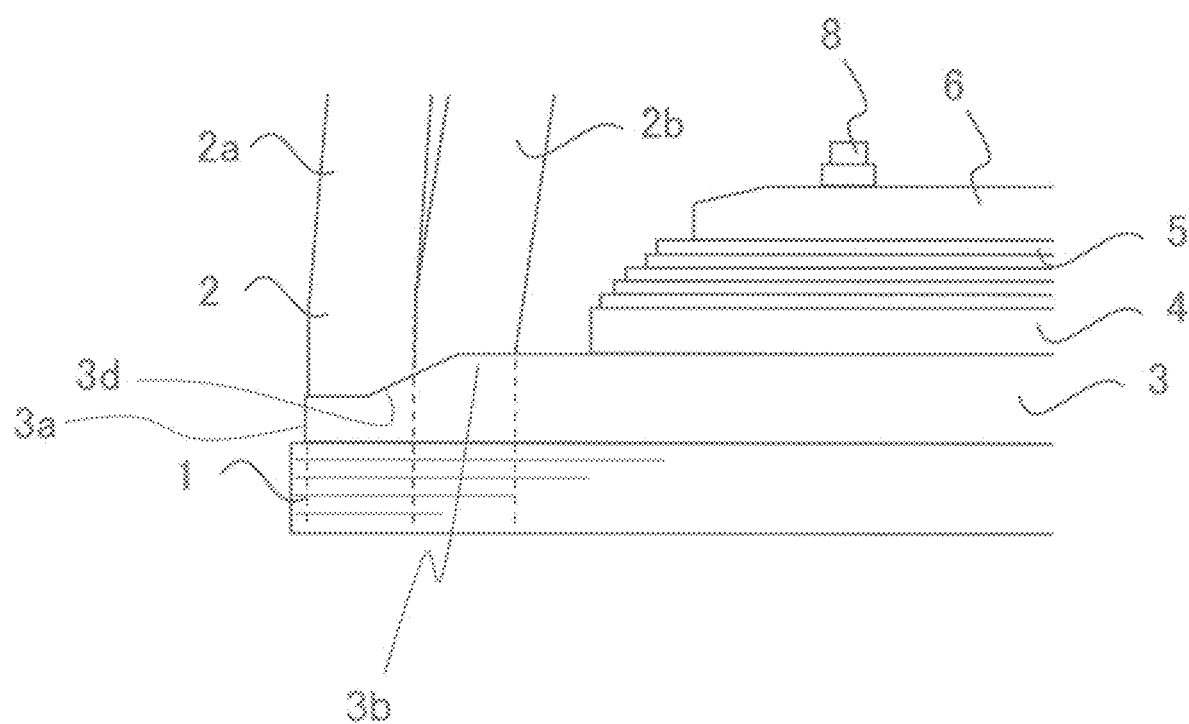
FIG. 7 is a cross-sectional view showing a main part of the stator of the rotating electric machine according to Embodiment 2.

In the case of obliquely cutting, as shown in FIG. 7, a portion from the anti-stator core side 3b located lateral to a lower stator coil in the circumferential direction to the anti-stator core side 3b located lateral to the upper coil in the circumferential direction can be cut such that the cut surface 3d is obliquely formed. Accordingly, the mechanical strength can be enhanced similar to the above.

Embodiment 3

Figure 8:
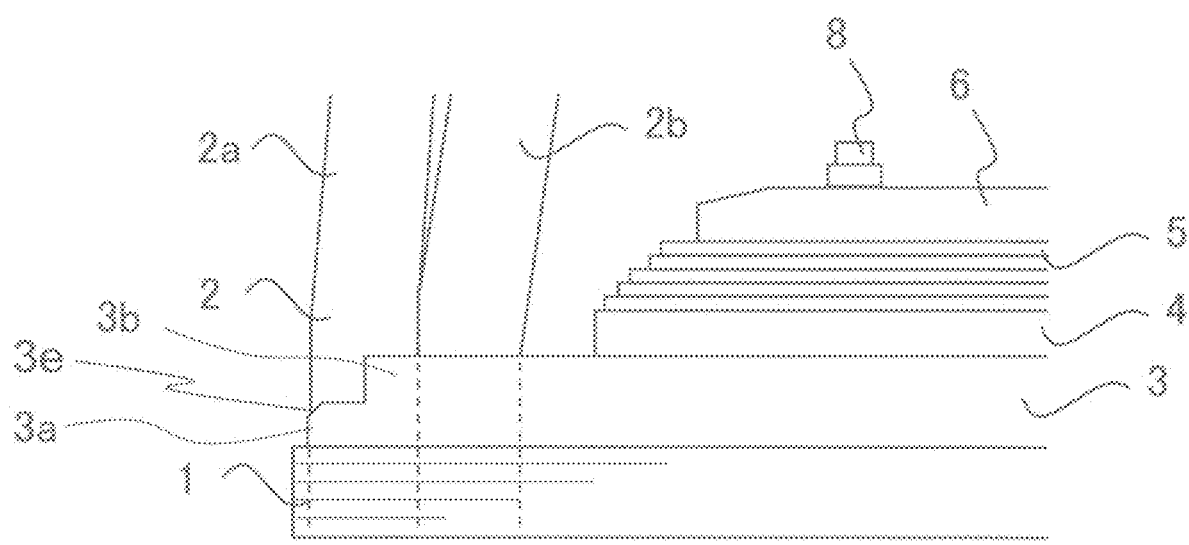
FIG. 8 is a cross-sectional view showing a main part of a stator of a rotating electric machine according to Embodiment 3.

FIG. 8 is a cross-sectional view showing a main part of a stator of a rotating electric machine according to Embodiment 3. In the drawing, the same reference characters as those in Embodiment 1 denote identical or corresponding parts. In FIG. 8, a part of a finger plate 3 from any position at the anti-stator core side 3b located lateral to the upper stator coil in the circumferential direction to the radially inner end portion 3a is processed by cutting-off so as to form a rectangular parallelepiped shape, and a chamfered structure is provided at the anti-stator core side of the radially inner end portion 3a. That is, a chamfered portion 3e is provided between the radially inner end portion 3a and a surface, perpendicular to the axial direction, of the rectangular parallelepiped-shaped notch in the structure in FIG. 2. The anti-stator core side of the radially inner end portion 3a almost does not contribute to pressing the stator core 1. Therefore, even if the chamfered portion 3e is provided, the height of the radially inner end portion 3a of the finger plate 3 can be reduced almost without diminishing the function of pressing the stator core 1 in the axial direction.

In Embodiment 3, the height of the radially inner end portion 3a of the finger plate 3 can be reduced as compared to that in the structure in Embodiment 1. Thus, loss by eddy currents generated at the finger plate 3 can be reduced, and such loss can be reduced more than in Embodiment 1.

In FIG. 8, the example in which a chamfered portion is provided in the structure in FIG. 2 has been described, but a chamfered portion may be provided in the structure shown in FIG. 6 or FIG. 7 in Embodiment 2.

Embodiment 4

Figure 9:
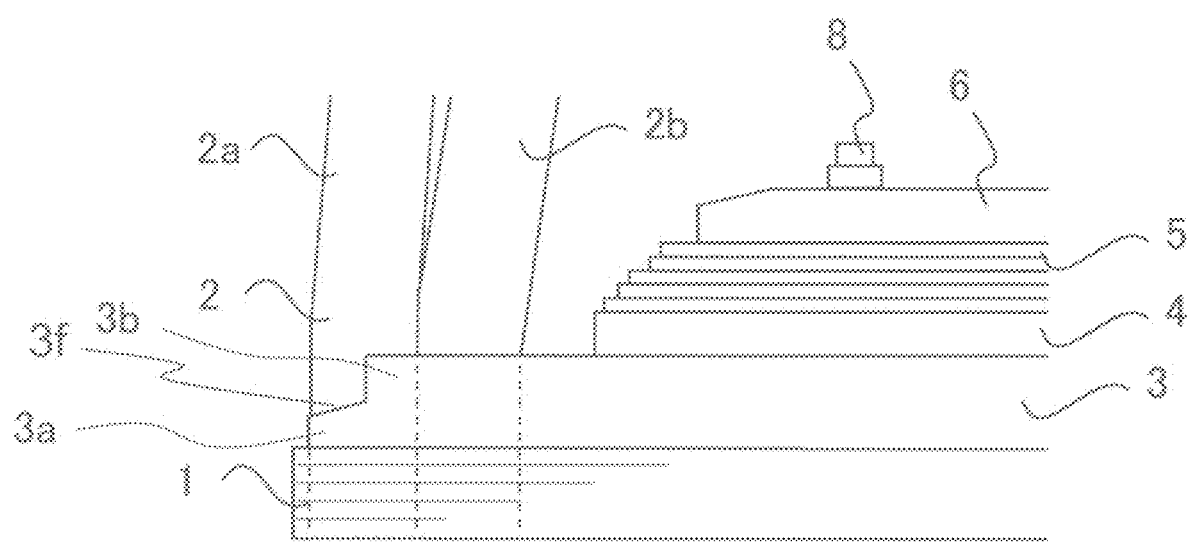
FIG. 9 is a cross-sectional view showing a main part of a stator of a rotating electric machine according to Embodiment 4.

FIG. 9 is a cross-sectional view showing a main part of a stator of a rotating electric machine according to Embodiment 4. In the drawing, the same reference characters as those in Embodiment 1 denote identical or corresponding parts. In FIG. 9, a part of the finger plate 3 from any position at the anti-stator core side 3b located lateral to the upper stator coil in the circumferential direction to the radially inner end portion 3a is processed by cutting-off, and the cut-off end portion of the finger plate 3 has a tapered shape. That is, a surface, opposed to the end surface of the stator core 1, of the rectangular parallelepiped-shaped notch in the structure in FIG. 2 is further formed as a tapered surface 3f such that the height thereof gradually decreases toward the radially inner end portion 3a. Since the tapered surface 3f is provided as described above, the height of the radially inner end portion 3a can be reduced while a pressing force, to the stator core 1, that is substantially equal to that in the configuration in Embodiment 1 is maintained.

In Embodiment 4, the height of the finger plate 3 can be further reduced as compared to that in the structure in Embodiment 1. Thus, loss by eddy currents generated at the finger plate 3 can be reduced, and such loss can be reduced more than in Embodiment 1.

In FIG. 9, the example in which a tapered surface is provided in the structure in FIG. 2 has been described. But a tapered surface may be provided in the structure shown in FIG. 6 or FIG. 7 in Embodiment 2, and further in the structure shown in FIG. 8 in Embodiment 3.

Within the scope of the present invention, the above embodiments may be freely combined with each other, or each of the above embodiments may be modified or eliminated appropriately.

The invention claimed is:

1. A stator of a rotating electric machine, comprising: a stator core that has a plurality of slots and in which electromagnetic steel sheets are stacked in the axial direction; stator coils inserted into the slots; and a finger plate provided on an axially outer end surface of the stator core, wherein a rectangular parallelepiped-shaped notch is provided on a part of the finger plate from any position at an anti-stator core side located lateral to an upper stator coil in a circumferential direction to a radially inner end portion of the finger plate, at least one portion of the finger plate surface of the notch, on the anti-stator core side, being at least one of parallel or perpendicular to the stator core side of the finger plate, wherein a chamfered portion is provided at the radially inner end portion.

\* \* \* \* \*